United States Patent
Cooper

(10) Patent No.: US 6,691,742 B1
(45) Date of Patent: Feb. 17, 2004

(54) METHOD AND APPARATUS FOR SUPPORTING A PIPE

(76) Inventor: Thomas L. Cooper, 13909 Sparta Ave., Kent City, MI (US) 49330

( * ) Notice: Subject to any disclaimer, the term of this patent is extended or adjusted under 35 U.S.C. 154(b) by 0 days.

(21) Appl. No.: 10/423,159

(22) Filed: Apr. 25, 2003

(51) Int. Cl.$^7$ ................................................. F16L 3/00
(52) U.S. Cl. ...................... 138/106; 138/107; 138/149; 138/140; 248/58; 248/62
(58) Field of Search ................................. 138/106, 107, 138/140, 141, 137, 149; 248/58, 62

(56) References Cited

U.S. PATENT DOCUMENTS

| | | | |
|---|---|---|---|
| 1,079,759 A | 11/1913 | Gray | 248/55 |
| 1,788,939 A | 1/1931 | Axlund | 138/106 |
| 1,911,485 A | 5/1933 | Axlund | 248/55 |
| 2,116,302 A | 5/1938 | Chernosky | 138/106 |
| 3,003,726 A | 10/1961 | Duhamel | 248/55 |
| 3,016,219 A | 1/1962 | Murphy | 248/55 |
| 3,122,346 A | 2/1964 | Seiler | 138/107 |
| 3,244,388 A * | 4/1966 | Coffman | 248/62 |
| 3,315,927 A | 4/1967 | Malloy et al. | 248/55 |
| 3,472,474 A | 10/1969 | Fountain et al. | 248/55 |
| 3,530,899 A * | 9/1970 | Breeding | 138/107 |
| 3,539,137 A * | 11/1970 | March | 248/62 |
| 3,653,618 A * | 4/1972 | Kindorf et al. | 248/58 |
| 3,769,190 A | 10/1973 | Deem, Jr. | 204/196.15 |
| 3,963,205 A | 6/1976 | Hageman | 248/55 |
| 3,965,938 A * | 6/1976 | Bauerle et al. | 138/107 |
| 4,006,874 A | 2/1977 | McGee | 248/74.3 |
| 4,017,046 A | 4/1977 | Hicks | 248/55 |
| 4,121,796 A * | 10/1978 | Forbes | 248/62 |
| 4,140,292 A | 2/1979 | Kaigler, Jr. deceased | 248/49 |
| 4,146,203 A | 3/1979 | Williams | 248/62 |
| 4,158,541 A * | 6/1979 | Klechka et al. | 432/116 |
| 4,202,090 A | 5/1980 | Cook | 29/417 |
| 4,323,088 A * | 4/1982 | McClellan | 138/106 |
| 4,403,759 A | 9/1983 | Hicks | 248/55 |
| 4,951,902 A * | 8/1990 | Hardtke | 248/74.1 |
| 5,192,039 A * | 3/1993 | Williams | 248/62 |
| 5,381,833 A * | 1/1995 | Cummings et al. | 138/107 |
| D398,048 S | 9/1998 | Casady et al. | D23/386 |
| 6,224,025 B1 | 5/2001 | Alvarez | 248/58 |
| 6,283,158 B1 * | 9/2001 | Botsolas et al. | 138/110 |

FOREIGN PATENT DOCUMENTS

| | | |
|---|---|---|
| GB | 2168775 | 6/1986 |
| GB | 2175667 | 12/1986 |

* cited by examiner

*Primary Examiner*—Patrick Brinson
(74) *Attorney, Agent, or Firm*—Price, Heneveld, Cooper, Dewitt & Litton

(57) ABSTRACT

A pipe assembly includes pipe having a protecting saddle connected thereto. A support member and a support saddle are provided to sustain the pipe, with the protecting saddle resting on the support saddle. One of the protecting saddle and the support saddle has a slippery coating to allow the pipe to move relative to the support saddle.

42 Claims, 2 Drawing Sheets

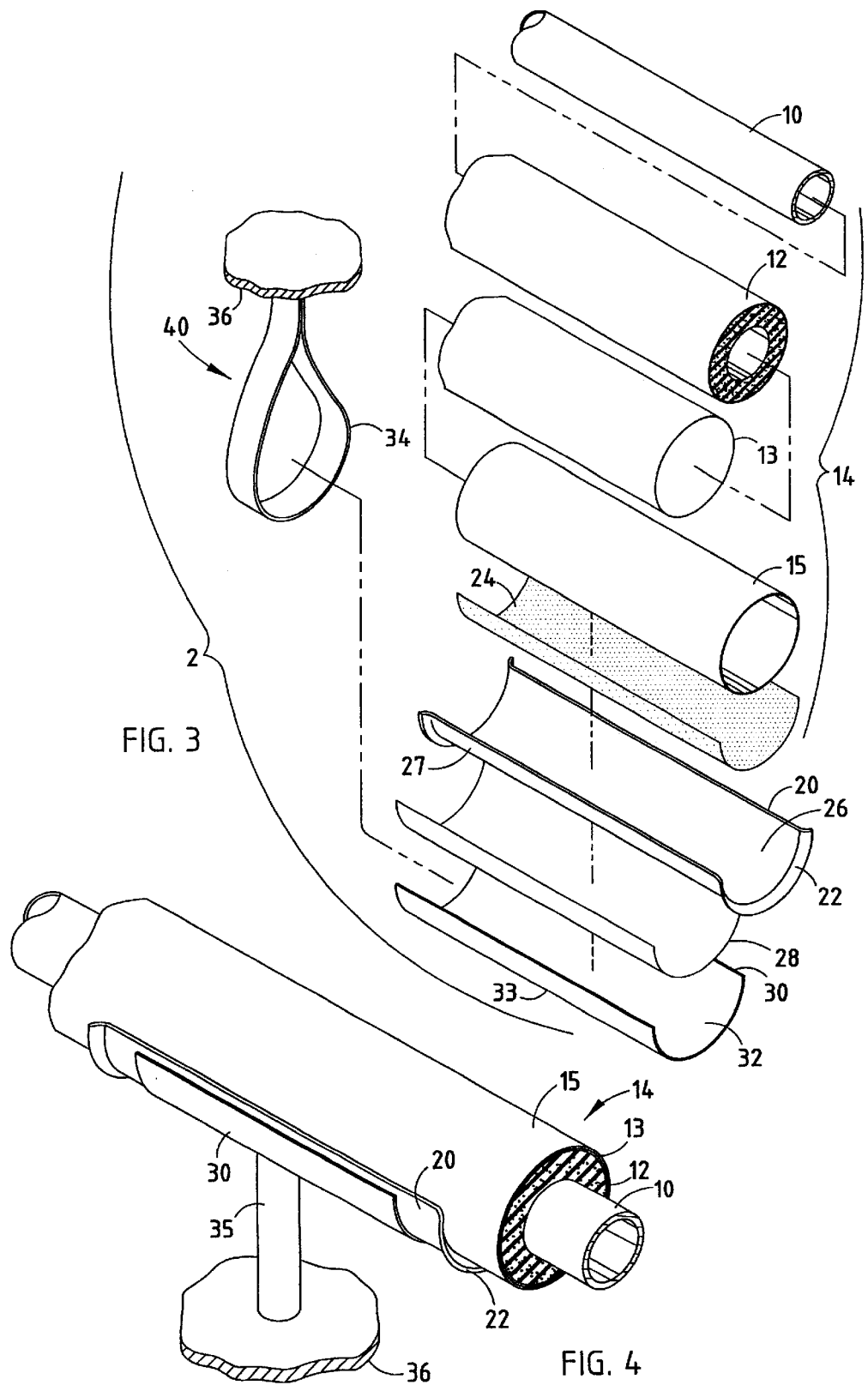

METHOD AND APPARATUS FOR SUPPORTING A PIPE

BACKGROUND OF THE INVENTION

The present invention relates to pipe supports, and in particular to a system and method for supporting a pipe.

Buildings in general, but more appropriately, commercial buildings must accommodate. large amounts of plumbing. In these buildings, it is quite normal for a vast piping network to exist. As such, various supporting structures have been developed in order to retain these pipes to their supporting surface. This network of piping is normally used to transport liquid or gaseous fluids, such as water and natural gas, to various locations within the building. Commonly, these pipes are insulated. This can be to shield the contents of the pipe from thermal change, to shield the exterior of the pipe from contact with someone or something within the building, or to acoustically insulate the pipe. Furthermore, cooling systems employ insulated pipes. Cooling systems include a refrigeration system for cooling the temperature of a fluid and a pipe for transporting the fluid to an evaporator wherein the cold temperature of the fluid is transferred to the air surrounding the evaporator to cool the air surrounding the evaporator. Heretofore, the coolant pipe coming from the refrigeration system has included insulation surrounding the pipe for maintaining the low temperature of the fluid within the pipe and for improving the efficiency of the cooling system. Furthermore, the insulation has included a vapor barrier surrounding the pipe and the insulation for keeping moisture in the air away from the pipe to prevent condensation of water on the outside surface of the pipe.

It is generally understood that this network of piping is subject to movement. This can be, for example, from building movement or from thermal expansion and contraction. It is because of this movement that various pipe supports have been invented which accommodate the movement while still offering support to the pipe. Unfortunately, contemporary supports do not address the damage that can be done to the insulative covering of the pipe. Most commonly available pipe supports, when subjected to pipe movement, tend to damage the insulation on the pipe. This is usually due to the support or saddle digging into and wearing away the insulation during movement.

Therefore, a need exists for an insulated pipe support that can be installed easily and quickly, that allows for relative movement between the support and the pipe, while protecting the pipe or the insulative material surrounding the pipe.

Accordingly, an apparatus that solves the aforementioned disadvantages and having the aforementioned advantages is desired.

SUMMARY OF THE PRESENT INVENTION

One aspect of the present invention provides a pipe assembly including a pipe having a protecting saddle connected thereto. A support member including a support saddle which sustains the pipe is also provided, where the protecting saddle rests on the support saddle. Further, one of the protecting saddle and the support saddle has a slippery coating to allow the pipe to move relative to the saddle.

Another aspect of the present invention includes providing a pipe assembly comprising a pipe, a protecting saddle, a support saddle and a support member. The protecting saddle at least partially covers the pipe and includes outwardly flared longitudinal ends. The support saddle supports the protecting saddle. The support member is configured to be supported from a surface and is in contact with the support saddle, thereby supporting the pipe.

In another aspect of the present invention, a pipe assembly includes a pipe and a semi-circular protecting saddle having an outer convex surface and an inner concave surface, with the inner concave surface being fixedly attached to the pipe. A semi-circular support saddle is also provided having an outer convex surface and an inner concave surface, the inner concave surface slidably supporting the outer convex surface of the protecting saddle. Further, one of the concave surfaces of the support saddle or the convex surfaces of the protecting saddle is covered with a low friction material.

In still another aspect of the present invention, a method is provided for supporting a pipe. The method includes providing an arcuate protecting saddle having an outer convex surface and an inner concave surface, and fixedly attaching the concave surface of the protecting saddle to the pipe. The method further includes providing an arcuate support saddle having an outer convex surface and an inner concave surface, and supporting the protecting saddle with the support saddle. The method further includes providing a support member and supporting the supporting saddle with the support member. Additionally, the support member is connected to a surface thereby supporting the pipe.

In yet another aspect of the present invention, a method of replacing an existing pipe support includes removing the existing pipe support and providing an arcuate protecting saddle having an outer convex surface and an inner concave surface. The inner concave surface of the protecting saddle is then adhered to the pipe. Further, an arcuate supporting saddle provides an outer convex surface and an inner concave surface which supports the protecting saddle. A support member is then provided which is connected to the support saddle. The support member connects to a surface, such as a ceiling, wall, or floor, and thereby supports the pipe.

These and other features, advantages, and objects of the present invention will be further understood and appreciated by those skilled in the art by reference to the following specification, claims and appended drawings.

BRIEF DESCRIPTION OF THE DRAWINGS

FIG. 3 is an exploded perspective partial view of the insulated pipe assembly of FIG. 1; and FIG. 4 is a perspective partial view of a second embodiment of the present invention.

DETAILED DESCRIPTION OF THE PREFERRED EMBODIMENTS

Figure 1:
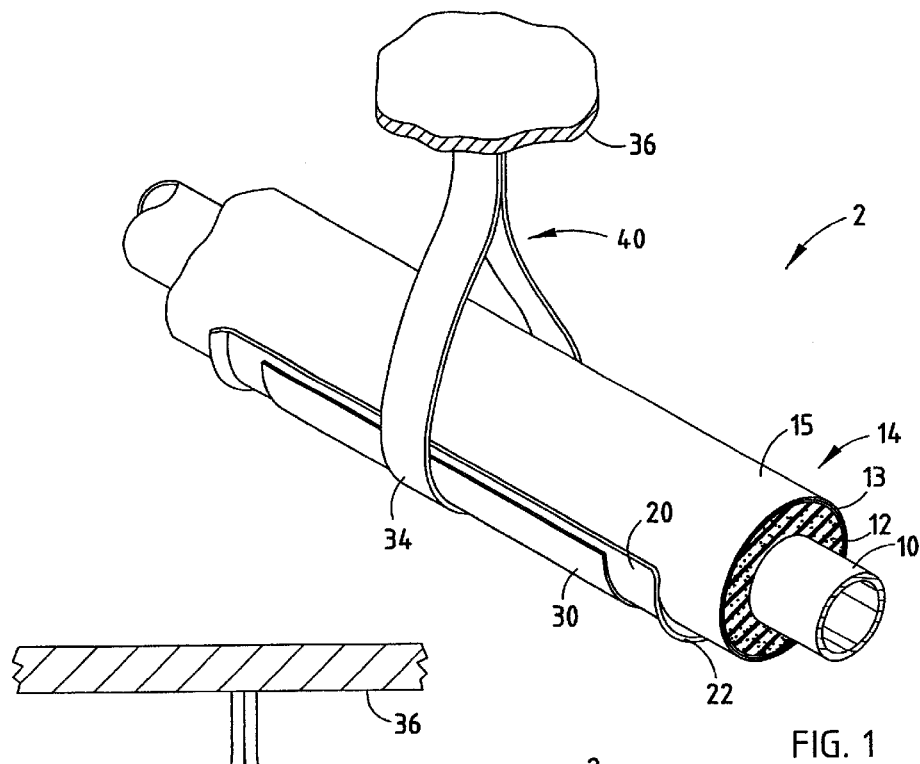
FIG. 1 is a perspective partial view of an insulated pipe assembly embodying the present invention including a support member attached to a surface.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Referring now to the drawings, particularly FIG. 1, there is shown in perspective view a pipe assembly system 2 of the present invention. The pipe assembly system 2 includes a pipe 14. The pipe assembly 2 includes a protecting saddle 20 connected to the exterior of the pipe 14. A support member 40 and a support saddle 30 support the pipe 14. Further, one of the protecting saddle 20 and the support saddle 30 has a slippery coating of low friction material 28 (see FIG. 2) to allow the pipe 14, together with protecting saddle 20, to move relative to the support saddle 30.

In the illustrated example, pipe 14 is preferably generally circular in geometry and may be used to transport hot or cold fluid or gaseous material of varying pressures. The pipe 14 includes an inner tubing 10 and can also include insulation 12, a vapor barrier 13 and an outer protective jacket 15. The tubing 10 is made of any material suitable for the contents which tubing 10 transports. Preferably, the tubing 10 has the insulation 12 at least partially surrounding it. The insulation 12 is generally well known in the art and may be fabricated from any material suitable for an insulative purpose. The insulation 12 may be at least partially covered with the vapor barrier 13. The vapor barrier 13 prevents condensation from forming on the tubing 10 and protects the insulation 12. The pipe 10, the insulation 12, the vapor barrier 13 and the protective jacket 15 combine to form the pipe 14, which is generally well known in the art. Although the pipe 14 is shown as including the tubing 10, insulation 12, the vapor barrier 13 and the outer protective jacket 15, it is contemplated that the pipe 14 could include only the tubing 10, only the tubing 10 and the insulation 12, only the tubing 10, the insulation 12 and the vapor barrier 13 or the tubing 10, the insulation 12, the vapor barrier 13 and the outer protective jacket 15.

The illustrated protecting saddle 20 is generally a length of any suitable material and semicircular in shape. However, the shape of the protecting saddle 20 may be of any form such that it conforms to the outer surface of the pipe 14. Furthermore, the protecting saddle 20 may either fully or partially surround the pipe 14.

Figure 2:
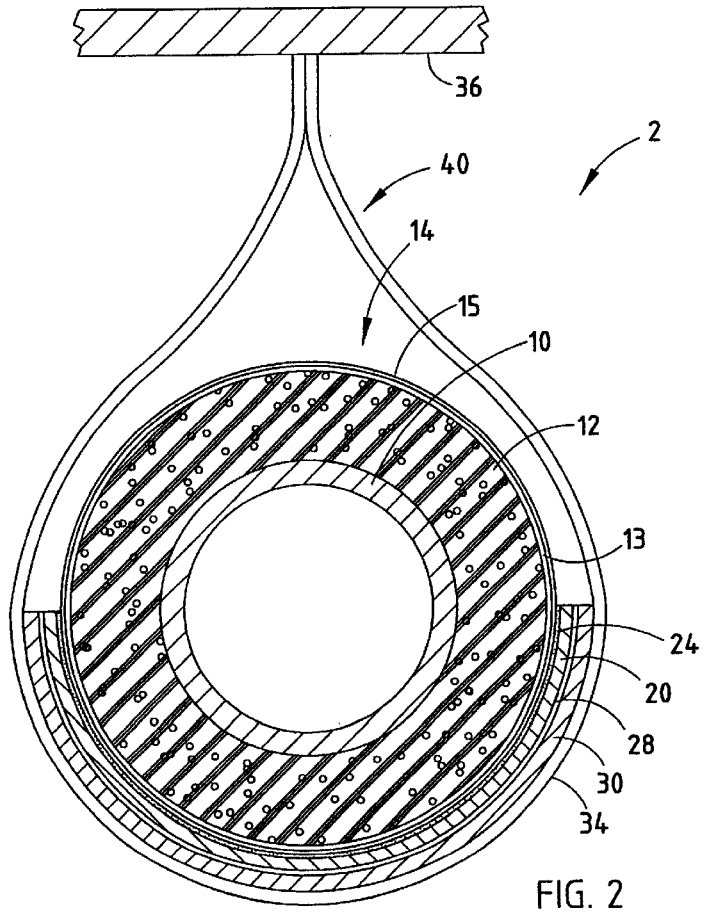
FIG. 2 is a cross-sectional view of the support assembly shown in FIG. 1.

In one embodiment of the current invention (FIG. 2), the protecting saddle 20 is affixed to the outer layer of pipe 14. The protecting saddle 20 may be affixed to the pipe 14 through various means including, but not limited to, adhesive retention. Furthermore, it is contemplated that the adhesive may be supplied in numerous forms. FIG. 2 depicts an embodiment where an adhesive film 24 is applied to the interior surface 26 (FIG. 3) of the protecting saddle 20. However, the protecting saddle 20 may also be mechanically fastened to the pipe 14. In an embodiment of the current invention, the protecting saddle 20 may have a flange 22 positioned at opposite longitudinal ends thereof. Each flange 22 may be directed radially outwardly away from the longitudinal surface of protecting saddle 20. In the preferred embodiment, the protecting saddle 20 is semicircular in shape and has radially outwardly-flared flanges 22, a concave surface 26 and a convex surface 27. The concave surface 26 being adhesively attached to the outer surface of insulated pipe 14.

The illustrated support saddle 30 is generally of the same shape as the protecting saddle 20 and is configured to support the protecting saddle 20. This is accomplished by having a concave surface 32 of support saddle 30 at least partially engage the convex surface 27 of the protecting saddle 20. The support saddle 30 is generally semicircular in shape having the concave surface 32 and a convex surface 33. The concave surface 32 of the support saddle 30 is at least slightly bigger in its radial dimension then the convex surface 27 of the protecting saddle 20, thus allowing the support saddle 30 to "cup" the protecting saddle 20.

In the illustrative example, the support member 40 supports the support saddle 30. The support member 40 is generally a strap 34 (FIG. 2) or a bar 35 (FIG. 4) sustaining the support saddle 30, thereby supporting the pipe 14 in its required position. In one embodiment (FIG. 2), the support member 40 is the strap 34, with at least one end attached to a surface 36. As illustrated in FIG. 2, the surface 36 is a ceiling. The other end of the support member 40 may be attached to the support saddle 30, or the support member 40 may be formed so that the strap 34 creates a loop which is attached to the convex surface 33 of the support saddle 30 (FIG. 3). It is to be understood however, that the support member 40 may take numerous forms and may support the support saddle 30 in various manners without departing from the scope of the preferred embodiment. In another embodiment (FIG. 4), the support member 40 is the bar 35 attached to the surface 36. In FIG. 4, the surface 36 is a floor surface. Therefore, instead of being suspended from a surface such as a ceiling, the support member 40 is supported on a floor. However, it is envisioned that this supporting system could be utilized to support a length of pipe in either a horizontal or vertical position, or any variant thereof.

In a preferred embodiment of the present invention, the protecting saddle 20 is adhesively secured to the pipe 14 at a location where the pipe 14 is to be supported within a building. Either a portion of the convex surface 27 of the protecting saddle 20 or a portion of the concave surface 32 of the support saddle 30 is fitted with the low friction material 28. The low friction material 28 is preferably a UHMW film having an adhesive backing, such that the UHMW film may be adhered to one of these surfaces. It is contemplated that the low friction material 28 can be any material that has a lower coefficient of friction than the protecting saddle 20 and/or the support saddle 30. It is further contemplated that the low friction 28 could be UHMWPE, teflon or similar material. The low friction material 28 allows the protecting saddle 20, which is adhered to the pipe 14, to move relative to the support saddle 30. Therefore, when the pipe 14 is subjected to movement, the pipe 14 and the protecting saddle 20 may move relative to the support saddle 30, while still being supported by support member 40. Further, through this support system, the protecting saddle 20 is subjected to the stresses of movement rather than the outer layer of the pipe 14. The pipe 14 is thereby protected from any damage due to movement of the pipe 14.

Accordingly, the pipe 14 is supported by the support member 40, the support saddle 30 and the surface 36. The support saddle 30 in turn supports the protecting saddle 20, which in turn supports the pipe 14. As described previously, the support member 40 may be suspended from a ceiling, thereby retaining the pipe 14 in a suspended mode, or supported from a floor surface, thereby supporting the pipe 14 from a floor surface.

In an embodiment of the present invention, a method of replacing an existing pipe includes, firstly, removing an existing pipe support. The arcuate protecting saddle 20 having the convex surface 27 and the inner concave surface 26 is then provided. The inner concave surface 26 of the protecting saddle 20 is adhered to the pipe 14. The arcuate support saddle 30, having the outer convex surface 33 and the inner concave surface 32, is provided and engaged with the protecting saddle 20. The support member 40 is connected to the support saddle 30 and the support member 40 is connected to the surface 36, thereby supporting the pipe 14. As described above, in an embodiment of the present method, the protecting saddle 20 includes radially outwardly-extending flanges 22. Furthermore, one of the convex surface 27 of the protecting saddle 20 or the concave surface 32 of the support saddle 30 is at least partially covered with a low friction material which allows the two surfaces to move relative to one another while protecting the outer layer of the pipe 14 from damage.

Advantageously, the pipe assembly system 2 of the present invention allows new applications to be fitted and existing applications to be retrofitted with a pipe support assembly that is easy to install, protects the pipe's insulation, and allows relative movement between the two saddles. Additionally, due to the low friction material being positioned between the two surfaces, the surfaces move relatively easily between one another thereby eliminating any noise which may be created between the two surfaces from the relative movement. Further, in the preferred embodiment of the present invention, the protecting saddle has outwardly-flared longitudinal ends such that the support saddle must remain within and on, the protecting saddle, thereby removing the chance that the pipe may move to such an extent that the support saddle is moved off of the protecting saddle. Additionally, the outwardly-flared ends keep the ends of the protecting saddle from digging into and damaging the insulative material of the pipe. Consequently, the long term cost of this support assembly is less than contemporary support assemblies.

The solutions offered by the invention herein have thus been attained in an economical, practical, and facile manner. To wit, a novel pipe support assembly which is cost effective and easily installed has been invented. While preferred embodiments and example configurations of the invention have been herein illustrated, shown, and described, it is to be appreciated that various changes, rearrangements, and modifications may be made therein, without departing from the scope of the invention as defined by the appended claims. It is intended that the specific embodiments and configurations disclosed are illustrative of the preferred and best modes for practicing the invention, and should not be interpreted as limitations on the scope of the invention as defined by the appended claims and it is to be appreciated that various changes, rearrangements, and modifications may be made therein, without departing from the scope of the invention as defined by the appended claims.

The invention claimed is:

1. A pipe assembly comprising:

a pipe having a protecting saddle connected thereto;

a support saddle sustaining the pipe, with the protecting saddle resting on the support saddle; and a support member supporting the support saddle;
    wherein one of the protecting saddle and the support saddle has a slippery coating to allow the pipe to move relative to the support saddle.

2. The pipe assembly of claim 1, wherein:

the protecting saddle includes outwardly flared longitudinal ends.

3. The pipe assembly of claim 2, wherein:

the protecting saddle, the support saddle, and the outwardly flared longitudinal ends are arcuate in shape.

4. The pipe assembly of claim 1, wherein:

the slippery coating is UHMW film with an adhesive backing.

5. The pipe assembly of claim 1, wherein:

the protecting panel is adhesively attached to the pipe.

6. The pipe assembly of claim 4, wherein:

the support saddle is fixedly attached to the support member.

7. The pipe assembly of claim 1, wherein:

the pipe includes insulation.

8. The pipe assembly of claim 7, wherein:

the pipe further includes a vapor barrier surrounding the insulation.

9. The pipe assembly of claim 8, wherein:

the pipe further includes a protective jacket surrounding the vapor barrier.

10. A pipe assembly comprising:

a pipe;

a protecting saddle at least partially covering the pipe, the protecting saddle including outwardly flared longitudinal ends;

a support saddle supporting the protecting saddle; and a support member configured to be supported from a surface;
    wherein the support member is in contact with the support saddle, thereby supporting the pipe.

11. The pipe assembly of claim 10, wherein:

the protecting saddle, the support saddle, and the outwardly flared longitudinal ends are arcuate in shape.

12. The pipe assembly of claim 10, wherein:

the one of the protecting saddle or the support saddle is at least partially covered with a low friction material.

13. The pipe assembly of claim 12, wherein:

the low friction material is UHMW film with an adhesive backing.

14. The pipe assembly of claim 12, wherein:

the protecting saddle is fixedly attached to the pipe.

15. The pipe assembly of claim 14, wherein:

the protecting saddle is adhesively attached to the pipe.

16. The pipe assembly of claim 14, wherein:

the support member is a hanger adapted to be fixedly attached to the surface.

17. The pipe assembly of claim 14, wherein:

the support saddle is fixedly attached to the support member.

18. The pipe assembly of claim 10, wherein:

the pipe includes insulation.

19. The pipe assembly of claim 18, wherein:

the pipe further includes a vapor barrier surrounding the insulation.

20. The pipe assembly of claim 19, wherein:

the pipe further includes a protective jacket surrounding the vapor barrier.

21. A pipe assembly comprising:

a pipe;

a semi-circular protecting saddle having a protecting convex surface and a protecting concave surface, the protecting concave surface fixedly attached to the pipe; and a semi-circular support saddle having a supporting convex surface and a supporting concave surface, the supporting concave surface slidably supporting the protecting convex surface of the protecting saddle;

wherein one of the supporting concave surface of the support saddle or the protecting convex surface of the protecting saddle is covered with a low friction material.

22. The pipe assembly of claim 21, wherein:

the protecting saddle includes radially outwardly flared ends.

23. The pipe assembly of claim 21, further including:

a support member, wherein the support saddle is fixedly connected to the support member for supporting the pipe from a surface.

24. The pipe assembly of claim 21, wherein:

the pipe includes insulation.

25. The pipe assembly of claim 24, wherein:

the pipe further includes a vapor barrier surrounding the insulation.

26. The pipe assembly of claim 25, wherein:

the pipe further includes a protective jacket surrounding the vapor barrier.

27. A method of supporting a pipe comprising:

providing an arcuate protecting saddle having a protecting convex surface and a protecting concave surface;

fixably attaching the protecting concave surface of the protecting saddle to the pipe;

providing an arcuate support saddle having a supporting convex surface and supporting concave surface;

supporting the protecting saddle with the supporting saddle;

providing a support member;

supporting the support saddle with the support member; and connecting the support member to a surface, thereby supporting the pipe.

28. The method of supporting the pipe of claim 27, wherein:

the protecting saddle includes radially outwardly extending flanges.

29. The method of supporting the pipe of claim 28, further comprising:

fixably attaching low friction material to one of the protecting convex surface of the protecting saddle or the supporting concave surface of the support saddle.

30. The method of supporting the pipe of claim 29, wherein:

the low friction material is UHMW film with an adhesive backing.

31. The method of supporting the pipe of claim 28, further comprising:

adhesively attaching the protecting concave surface of the protecting saddle to the pipe.

32. The method of supporting the pipe of claim 31, further comprising:

fixable attaching the support saddle to the support member.

33. The method of supporting the pipe of claim 27, wherein:

the pipe includes insulation.

34. The method of supporting the pipe of claim 33, wherein:

the pipe further includes a vapor barrier surrounding the insulation.

35. The method of supporting the pipe of claim 34, wherein:

the pipe further includes a protective jacket surrounding the vapor barrier.

36. A method of replacing an existing pipe support supporting an insulated pipe comprising:

removing the existing pipe support;

providing an arcuate protecting saddle having a protecting convex surface and protecting concave surface;

adhering the protecting concave surface of the protecting saddle to the pipe;

providing an arcuate supporting saddle having a supporting convex surface and a supporting concave surface;

supporting the protecting saddle with the supporting saddle;

providing a support member;

connecting the support member to the supporting saddle; and connecting the support member to a surface, thereby supporting the insulated pipe.

37. The method of replacing the pipe support of claim 36, further comprising:

adhering a piece of low friction film to one of the protecting convex surface of the protecting saddle or the supporting concave surface of the supporting saddle.

38. The method of replacing the pipe support of claim 37, wherein:

the low friction film is a piece of UHMW film.

39. The method of replacing the pipe support of claim 38, wherein:

the protecting saddle includes radially outwardly extending flanges.

40. The method of replacing the pipe support of claim 36, wherein:

the pipe includes insulation.

41. The method of replacing the pipe support of claim 40, wherein:

the pipe further includes a vapor barrier surrounding the insulation.

42. The method of replacing the pipe support of claim 41, wherein:

the pipe further includes a protective jacket surrounding the vapor barrier.

* * * * *